June 12, 1951 — O. TALLAKSEN — 2,556,507
FISH LURE
Filed May 29, 1950
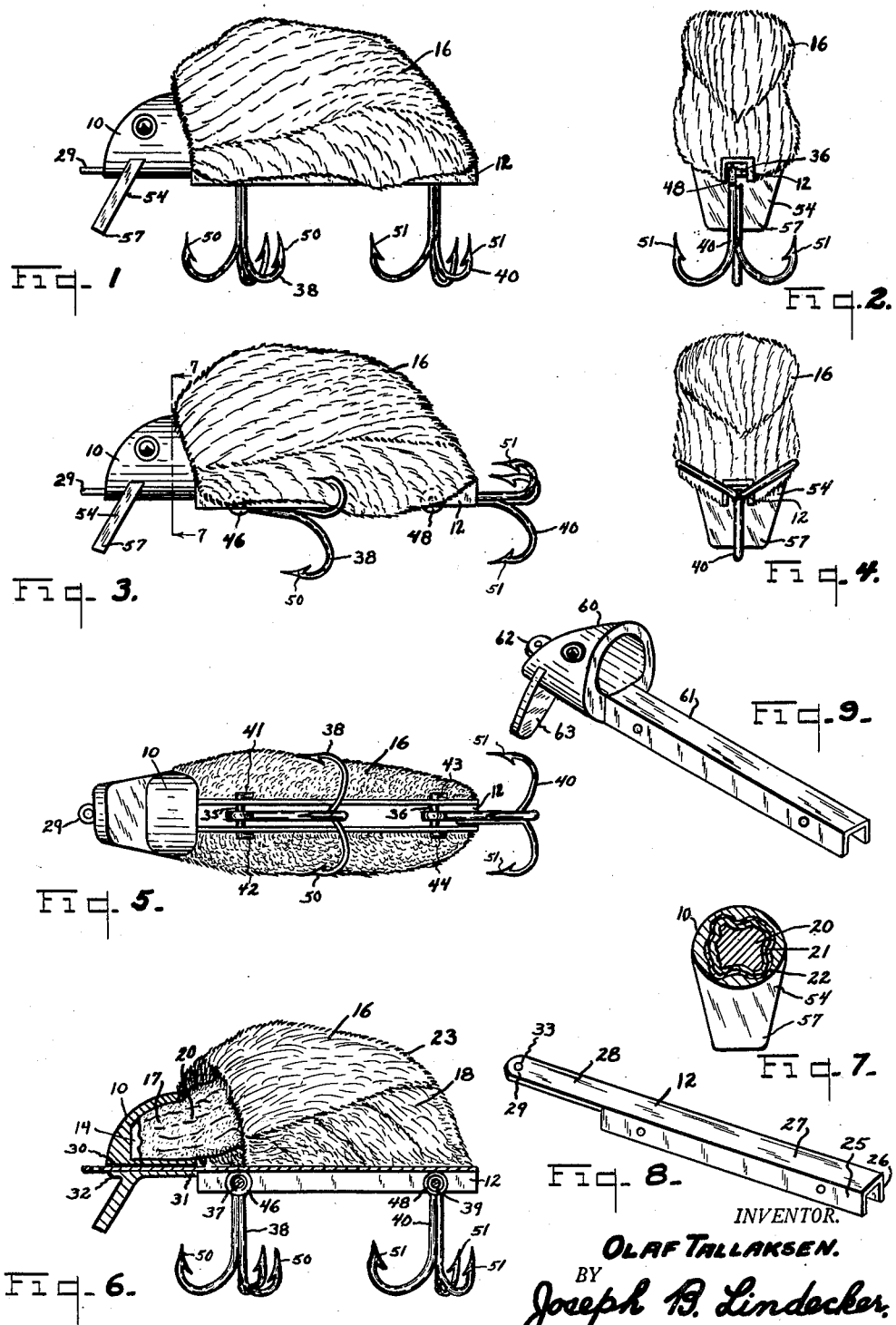
INVENTOR.
OLAF TALLAKSEN.
BY Joseph B. Lindecker,
ATTORNEY.

Patented June 12, 1951

2,556,507

UNITED STATES PATENT OFFICE 2,556,507

FISH LURE

Olaf Tallaksen, Chicago, Ill.

Application May 29, 1950, Serial No. 164,997

15 Claims. (Cl. 43—42.36)

The present invention relates to fishing lures and more specifically, to a novel constructed hairy type lure comprising a portion of an animal and used for casting or trolling.

Another object is to provide a hairy fish lure which simulates a live bait and presents the same to larger fish.

Still another object is to provide a hairy fish lure of a novel construction which will not lose its appearance when becoming wet, due to its natural substantially solid bone construction, consequently the lure will simulate a live bait and the fish to be caught will bite into it with force and not try to spit it out, thereby giving the fisherman a better chance to set the hook of the lure.

Still another object is to provide a hairy fish lure comprising a hairy body portion, a head portion, a metal member passing through said head from end to end and extending rearwardly beneath said body portion and in contact with the nether portion thereof, and a loosely hanging hook attached to said metal member in position to trail downwardly and rearwardly with respect to said body portion.

Still another object is to provide a hairy fish lure comprising a head portion and a hairy body portion, a foot from a suitable animal such as a woodchuck, mink or rabbit forming said body portion, a metal member having a front and rear portion, said front portion passing through said head from end to end parallel with and close to the nether portion of said head, said rear portion of said metal member being a U-shaped channel portion and mounted in an inverted position, and extending rearwardly and snugly against the underside of the body, and a hook carried by said metal member whereby it will hang downwardly with respect to said body portion.

Still another object is to provide a hairy fish lure comprising a head portion and a hairy body portion, a foot from a suitable rodent mammal forming said body portion, a metal member having a front and rear portion, said front portion passing through said head from end to end parallel with and close to the nether portion of said head, said rear portion of said metal member being a U-shaped channel portion and mounted in an inverted position and extending rearwardly and snugly against the underside of the body, said metal member having a plurality of pins mounted laterally from its depending sides and extending across its channel, and a plurality of hooks carried by said pins, whereby they will hang freely downwardly from said channel member and capable of swinging rearwardly and forwardly with respect to said channel member.

Still another object is to provide a hairy fish lure having a hairy body member, a suitable head member with an inclined nose portion, a rigid member extending outwardly from said nose and forming a means for connection with a fish line, a rigid member extending rearwardly from said head member and snugly in contact with the nether portion of said body, and substantially covered by the hair on said body, said body portion comprising the paw and remaining foot portion of a hairy rodent mammal, said paw thereof forming the rear end of the body, the forward end of the body being the severed end of the foot, said severed end being mounted within said head portion of the lure, and a plurality of hooks depending from and carried by the rigid member.

Still another object is to provide a hairy fish lure and to provide means to prevent the hooks thereof from becoming entangled in the hairy part of the lure.

Still another object is to provide a hairy fish lure that has a natural odorizing substance in its body and distributes it in the water for the purpose of attracting large fish.

Still another object is to provide a hairy fish lure that is easy and economical to construct.

A further object is to provide a hairy fish lure that simulates a small live animal by using the foot of a rabbit as the body portion of the lure.

This invention also consists in certain other features of construction and in the combination and arrangement of the several parts, to be hereinafter fully described, illustrated in the accompanying drawings and specifically pointed out in the appended claims.

Numerous fish lures in the past have been constructed with bucktails, hair, or imitation hair being a part thereof; however, said lures having no solid background lose their shape upon becoming wet; and further, this type of lure frequently sheds its hair and the lure itself will change in appearance.

In describing the present invention in detail, reference will be had to the accompanying drawing wherein like characters denote like or corresponding parts throughout the several views, and in which:

Figure 1 is a side elevation of a bait embodying the invention.

Figure 2 is a view looking at the rear end of the bait.

Figure 3 is a view similar to Figure 1 with the hooks in raised and trailing position.

Figure 4 is a view looking at the rear end of the bait shown in Figure 3.

Figure 5 is a bottom plan view of the lure as shown in Figure 3.

Figure 6 is a view similar to Figure 1 with sections broken away to show a portion of the lure body without hair, thus exposing the severed end portion of the mammal's foot; and further to show the channel member in section.

Figure 7 is a cross sectional view of the lure taken on plane of line 7—7 of Figure 3.

Figure 8 is a detail perspective view of the channel member embodied in the lure.

Figure 9 is a detail perspective view of a modified form of construction where the head portion and channel portion are constructed as a unit and of the same material.

The bait consists of the head 10 which is suitably shaped, and in some cases colored. Combined with the head and extending rearwardly therefrom is a channel member 12. The head portion and channel member may be made of any suitable material, such as wood, metal, rubber or plastic; the head having a cavity 14 formed in the rear end thereof and suitable to receive the front end of the lure body 16 which can be secured thereto by gluing, or by the use of prongs or other suitable means, to hold the body and head in close and substantially permanent arrangement. The lure body 16 consists of a foot from a suitable small hairy animal such as a rodent mammal, for example a woodchuck, mink or rabbit, and having a portion of the hair removed on the end 17, the end away from the paw 18 thereof; whereby said end portion 17 of the foot can be mounted and concealed in the head cavity 14. The object or purpose of removing the hair from end 17 of the foot is to make it possible with the aid of glue and a suitable filler to secure the end 17 of the foot to the head 10 and with said filler preventing water from penetrating past the front end 17 of the foot into any remaining void in the cavity.

Figure 7 shows by sectional view the bone 20, flesh 21, skin 22, and hair 23 as nature provides in a rodent mammal's foot. The bones 20 inside the flesh 21 and skin 22 will prevent the water changing the appearance of the lure and the lure with natural hair 23 positively secured to the skin will continue to simulate the creature it is intended to simulate, even if the hair or fur is wet, or partially worn off. This substantially solid body consisting of bone, flesh, skin and hair has a tendency to give off an odor when wet. This is important because all fish definitely have a sense of smell. The fish organs of smell are located in his nostrils. There are small holes in the top of the snout, but instead of connecting with the throat by passage, they open into small blind sacs just under the skin; the sacs are lined with organs of smell. The odor from the lure therefore will attract a large fish and cause this artificial lure to appear and function as a live fish lure.

The channel member 12 is of the special shape illustrated, having its body portion inverted with its side members 25 and 26 depending from the flat portion 27 thereof. The forward end 28 of said member 12 is substantially flat with the channel side members 25 and 26 omitted, whereby said portion 28 can extend through a slot 30 in the head 10, from end 31 to end 32 of the head, and allowing member 28 to extend outwardly therefrom. The terminal end 29 of portion 28 is provided with a hole, or eye 33 through which a line may be attached. The channel member 12 is shown as a separate member from that of the head 10, however should the occasion arrive, the head and channel member could be made as a single unit and of the same material. The side members 25 and 26 of the channel member 12 are provided with two holes each, to receive pins 35 and 36 arranged to extend laterally across the channel of said member 12, and form a supporting means for the depending hooks 38 and 40 provided with eyes 37 and 39, respectively. Said pin 35 is shown with its end portions 41, 42, and said pin 36 with its end portions 43 and 44 bent rearwardly to secure the respective pins to said channel member 12; however, said pins 35 and 36 can be fastened to said channel member in any desirable manner. Member 12 is juxtaposed said body 16 whereby the hair 23 will hang downwardly and substantially conceal member 12.

When the lure is drawn through the water, the hooks 38 and 40 trail in a substantialy horizontal position as shown by Figures 3, 4, and 5. Since the hooks 38 and 40 are arranged and suspended upon the pins 35 and 36 by having eye portions 46 and 48 in alignment with the channel of said member 12, the hooks can only pivot or swing backwardly, or forwardly upon said pins, thereby preventing the barbed ends 50 and 51 of hooks 38 and 40 from contacting the hair 23 of the lure.

A lip 54 is formed with the bottom of the head 10. The lower end 57 of said member 54 extends downwardly and forwardly from the lure head, as shown by Figures 1, 3, and 6. The shape and size of member 54 as shown gives the desired vertical and horizontal wobbling motion desired to simulate a live fish lure as in passing through the water.

Figure 9 shows a modified form of head 60 with channel portion 61, terminal end portion 62, and lip 63 formed with it as a unit where it is formed of metal or molded of rubber or plastic.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A fishing lure of the class described, comprising a head member, a body portion secured to said head member and mounted in a horizontal position with relation to said head member, a hook supporting member secured to said head member and extending rearwardly therefrom and arranged snugly and parallel with the nether portion of said body portion, a hook freely mounted upon said supporting member whereby it will hang freely downwardly in a manner which permits swinging solely in a vertical plane, and said body portion composed solely of a rabbit's foot.

2. A fishing lure of the class described, comprising a head member, a body portion embodying the foot of a suitable animal assembled to said head member, a channel member assembled to said head member and extending rearwardly beneath said body portion, said channel member arranged in an inverted position with a pin mounted laterally from its depending sides and extending across its channel, a fish hook freely mounted upon said pin whereby it will normally hang downwardly, and the depending sides of said channel permitting said hook to swing solely backwardly and forwardly in a vertical plane.

3. A fishing lure of the class described, having a body portion embodying a foot of a suitable animal; said body portion secured to a head member; a rigid U-shaped channel member assembled to said head member and extending rearwardly therefrom and arranged parallel with the nether portion of said body portion; said channel member arranged in an inverted position with pins mounted laterally from its depending sides and extending across said channel; fish hooks freely mounted upon said pins whereby they will hang freely downwardly therefrom; the eye portion of each of said hooks being arranged in alignment with the side walls of said channel member permitting said hooks to swing backwardly or forwardly in a vertical median plane embodying said entire lure, said hooks being substantially free from lateral motion.

4. A fishing lure of the class described, comprising a head member; a body portion embodying a whole foot of a rabbit, said foot being covered with its own natural fur and it being substantially solid with natural flesh, bones, and skin it will not change its shape when submerged in water; said body portion secured to said head member; a rigid U-shaped channel member assembled to said head member and extending rearwardly therefrom and parallel with the nether portion of said body portion; said channel member arranged in an inverted position with a pin mounted laterally from its depending sides and extending across said channel; a fish hook freely mounted upon said pin whereby it will hang freely downwardly therefrom; the eye portion of said hook being arranged in alignment with the side walls of said channel member permitting said hook to swing backwardly or forwardly in a vertical median plane embodying said entire lure, said hook being substantially free from lateral motion thereby preventing the barbed end of the hook from contacting the fur upon the body portion.

5. A fishing lure of the class described, comprising a head member; a body portion embodying a whole foot of a rabbit, said foot being covered with its own natural fur and it being substantially solid with natural flesh, bones, and skin it will not change its shape when submerged in water; said body portion secured to said head member; a rigid U-shaped channel member assembled to said head member and extending rearwardly therefrom and parallel with the nether portion of said body portion; said channel member arranged in an inverted position with pins mounted laterally from its depending sides and extending across said channel; a cluster of fish hooks freely mounted upon each of said pins whereby they will hang freely downwardly therefrom; the eye portion of each of said cluster of hooks being arranged in alignment with the side walls of said channel member permitting said hooks to swing backwardly or forwardly in a vertical median plane embodying said entire lure, said hooks being substantially free from lateral motion thereby preventing the barbed ends of the hooks from contacting the fur upon the body portion.

6. A fish lure comprising a hairy body portion formed from a rabbit's foot, a head portion, an inverted U-shaped channel metal member passing through said head from end to end and extending rearwardly beneath said body portion and in contact with the nether portion thereof, and a loosely hanging hook attached to a pin mounted in the side walls of said metal member in position to trail downwardly and rearwardly solely in a vertical plane with respect to said body portion.

7. A fish lure comprising a hairy body portion formed from a rabbit's foot, a head portion, an inverted U-shaped channel metal member passing through said head from end to end parallel with and close to the nether portion thereof, said member extending rearwardly beneath said body portion and in contact with the nether portion thereof, and a plurality of loosely hanging hooks attached to pins mounted in the side walls of said metal member in a manner whereby they will trail downwardly and rearwardly with respect to said body portion and swing solely in a vertical plane extending between the depending sides of said channel member.

8. A fish lure comprising a head portion and a hairy body portion, a foot from a suitable animal such as a woodchuck, mink or rabbit forming said body portion, a metal member having a front and rear portion, said front portion passing through said head from end to end parallel with and close to the nether portion of said head, said rear portion of said metal member being a U-shaped channel portion and mounted in an inverted position, and extending rearwardly and snugly against the underside of the body, and a hook carried by said metal member whereby it will hang downwardly with respect to said body portion and swing backwardly and forwardly in a vertical plane extending between the depending sides of said channel.

9. A fish lure comprising a head portion and a hairy body portion, a foot from a suitable rodent mammal forming said body portion, a metal member having a front and rear portion, said front portion passing through said head from end to end parallel with and close to the nether portion of said head, said rear portion of said metal member being a U-shaped channel portion and mounted in an inverted position and extending rearwardly and snugly against the underside of the body, and a plurality of hooks carried by pins mounted in the side walls of said metal member whereby they will hang downwardly with respect to said body portion and swing solely backwardly and forwardly in a vertical plane extending between the depending sides of said channel.

10. A fish lure comprising a head portion and a hairy body portion, a foot from a rabbit solely forming said body portion, a metal member having a front and rear portion, said front portion passing through said head from end to end parallel with and close to the nether portion of said head, said rear portion of said metal member being a U-shaped channel portion and mounted in an inverted position and extending rearwardly and snugly against the underside of the body, said metal member having a plurality of pins mounted laterally from its depending sides and extending across its channel, and a plurality of hooks carried by said pins, whereby they will hang freely downwardly from said channel member and capable of swinging solely rearwardly and forwardly in a vertical plane extending between the side walls of said channel portion.

11. A fishing lure of the class described having a hairy body portion and a suitable head portion, said body portion comprising solely the foot of a rabbit, the paw thereof forming the rear end of the body, the forward end of the body being the severed end of the foot, said severed end being mounted in said head portion of the lure, a rigid member passing through said head portion from end to end and having a U-shaped section extending rearwardly beneath said body portion and snugly in contact with the nether portion thereof, a pin extending from the depending sides of said channel member and extending across its channel, and a freely hanging hook attached to said pin.

12. A fishing lure of the class described having a hairy body member, a suitable head member with an inclined nose portion, and a rigid member passing through said head member from end to end, said rigid member extending outwardly from said nose and forming a means for connection with a fish line, said rigid member extending rearwardly from said head member having a rear section with depending sides, said section arranged snugly in contact with the nether portion of said body, and substantially covered by the hair on said body, said body portion comprising the paw and remaining portion of a rabbit's foot, said paw thereof forming the rear end of the body, the forward end of the body being the severed end of the foot, said severed end being mounted within said head portion of the lure, and a plurality of hooks depending from and carried by pins mounted in said rigid member.

13. A fish lure of the class described having a hairy body member, a head member, a rigid member passing through said head member from end to end and rearwardly therefrom, and a plurality of hooks carried by said rigid member, said head member having a forward nose portion and rear end portion with a cavity therein, said body member comprising the paw and remaining portion of a hairy rabbit's foot, said paw forming the rear end of said body, the forward end of the body being the severed end of the foot and secured within said cavity provided in the rear end of said head member, the rear end of said rigid member positioned and arranged snugly and parallel with the nether portion of said body to be substantially covered by the hair on said body, said rigid member beneath said body member being a U-shaped channel portion and arranged in an inverted position with pins mounted laterally from its depending sides and extending across its channel, and said hooks are freely mounted upon said pins within said channel whereby they will hang freely downwardly from the pins in a manner which permits free swinging rearwardly and forwardly solely in a vertical plane including said body.

14. A fish lure of the class described having a body member consisting entirely of animal matter and covered with its own fur which will not fade in color, said fur capable of fluffing outwardly and quivering when drawn through water, and said fur capable of giving off a smell which is agreeable to fishes, said body member secured to a head member having a forward nose portion and a rear portion with a cavity in said rear end, a rigid metal channel member having a flat forward section free of depending sides, said flat portion passing through said head member from end to end and parallel with the underside of said head member and close thereto, the channel section of said rigid member extending rearwardly from said head member, a plurality of hooks carried by said metal channel section, said body member comprising the paw and foot portion of a rabbit, said paw forming the rear end of said body, the forward end of the body being the severed end of the foot and secured within said cavity provided in the rear end of said head member, the rear end of said rigid member positioned and arranged snugly and parallel with the nether portion of said body to be substantially covered by the hair on said body, said rigid member beneath said body member being a U-shaped channel portion and arranged in an inverted position with pins mounted laterally from its depending sides and extending across its channel, and said hooks are freely mounted upon said pins within said channel whereby they will hang freely downwardly from the pins in a manner which permits free swinging rearwardly and forwardly solely in a vertical plane including said body.

15. A fish lure of the class described comprising a head member, a section of the foot of a rabbit including the paw and bone structure thereof covered by flesh, hide and fur for a lure body, said lure body secured to said lure head portion, said head portion having a metallic channel member extending rearwardly therefrom parallel with and snugly in contact with said body and supporting a freely hung fish hook which will trail downwardly and rearwardly therefrom and swing solely in a vertical plane.

OLAF TALLAKSEN.

REFERENCES CITED

The following references are of record in the file of this patent:

UNITED STATES PATENTS

| Number | Name | Date |
|---|---|---|
| 326,886 | Robinson | Sept. 22, 1885 |
| 2,147,444 | Kelly | Feb. 14, 1939 |
| 2,246,428 | Berlew | June 17, 1941 |
| 2,290,512 | Weesner | July 21, 1942 |
| 2,424,706 | Pelham | July 29, 1947 |